(12) United States Patent
Passov (10) Patent No.: US 12,205,015 B2
(45) Date of Patent: Jan. 21, 2025

(54) CONVOLUTIONAL NEURAL NETWORK WITH BUILDING BLOCKS

(71) Applicant: AUTOBRAINS TECHNOLOGIES LTD, Tel Aviv (IL)

(72) Inventor: Eli Passov, Hod Hasharon (IL)

(73) Assignee: AUTOBRAINS TECHNOLOGIES LTD., Tel Aviv (IL)

( * ) Notice: Subject to any disclaimer, the term of this patent is extended or adjusted under 35 U.S.C. 154(b) by 959 days.

(21) Appl. No.: 17/301,611

(22) Filed: Apr. 8, 2021

(65) Prior Publication Data

US 2021/0319296 A1 Oct. 14, 2021

Related U.S. Application Data

(60) Provisional application No. 63/006,828, filed on Apr. 8, 2020.

(51) Int. Cl.
*G06N 3/063* (2023.01)
*G06F 9/30* (2018.01)
*G06N 3/045* (2023.01)

(52) U.S. Cl.
CPC ......... *G06N 3/063* (2013.01); *G06F 9/30021* (2013.01); *G06F 9/30032* (2013.01); *G06N 3/045* (2023.01)

(58) Field of Classification Search
None
See application file for complete search history.

(56) References Cited

U.S. PATENT DOCUMENTS

| | | | | | |
|---|---|---|---|---|---|
| 9,557,994 | B2* | 1/2017 | Symes | ................ | G06F 9/30138 |
| 10,984,245 | B1* | 4/2021 | Tran | .................... | G06F 18/2111 |
| 11,915,125 | B2* | 2/2024 | Song | ..................... | G06F 7/5443 |
| 11,954,457 | B2* | 4/2024 | Song | ..................... | G06F 7/5443 |
| 11,967,044 | B2* | 4/2024 | Song | ..................... | G06T 3/4046 |
| 2002/0112147 | A1* | 8/2002 | Chennupaty | ........ | G06F 9/30032 |
| | | | | | 712/E9.034 |
| 2003/0084082 | A1* | 5/2003 | Debes | ..................... | G06F 17/15 |
| | | | | | 712/E9.034 |
| 2004/0054877 | A1* | 3/2004 | Macy, Jr. | ............ | G06F 9/30018 |
| | | | | | 712/E9.034 |
| 2004/0054878 | A1* | 3/2004 | Debes | ................. | G06F 9/30018 |
| | | | | | 712/E9.034 |
| 2017/0032222 | A1* | 2/2017 | Sharma | ................ | G06V 10/449 |

OTHER PUBLICATIONS

Lutz Roese-Koerner et al. "EffNet: An Efficient Structure for Convolutional Neural Networks", 2018 IEEE, pp .6-10.*
Wang et al. "Deep Parametric Continuous Convolutional Neural Networks", 2018 IEEE, pp. 2589-2597.*

* cited by examiner

*Primary Examiner* — Maikhanh Nguyen
(74) *Attorney, Agent, or Firm* — RECHES PATENTS (57) ABSTRACT

An apparatus that may include a neural network processor, the neural network processor comprises multiple building blocks. Each of the at least some of the building blocks may include, may consist or may consist essentially of a channel split unit, a convolution unit, a concatenation unit, and a shuffle unit.

14 Claims, 5 Drawing Sheets

CONVOLUTIONAL NEURAL NETWORK WITH BUILDING BLOCKS

BACKGROUND

One of the most common neural networks is a convolutional neural network (CNN). CNN requires extensive computational resources and may consume a lot of energy.

The ShuffleNet is convolutional network that is relatively efficient but requires dedicated units such as 1×1 convolution units, 7×7 convolutional units, and 3×3 depth wise convolutional units.

Using different types of convolutional units complicates the implementation of the CNN.

There is a growing need to provide an efficient convolutional neural network.

SUMMARY

There may be provided a method, system and computer readable medium for CNN and CNN processing.

BRIEF DESCRIPTION OF THE DRAWINGS

The embodiments of the disclosure will be understood and appreciated more fully from the following detailed description, taken in conjunction with the drawings in which.

DESCRIPTION OF EXAMPLE EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

Figure 1:
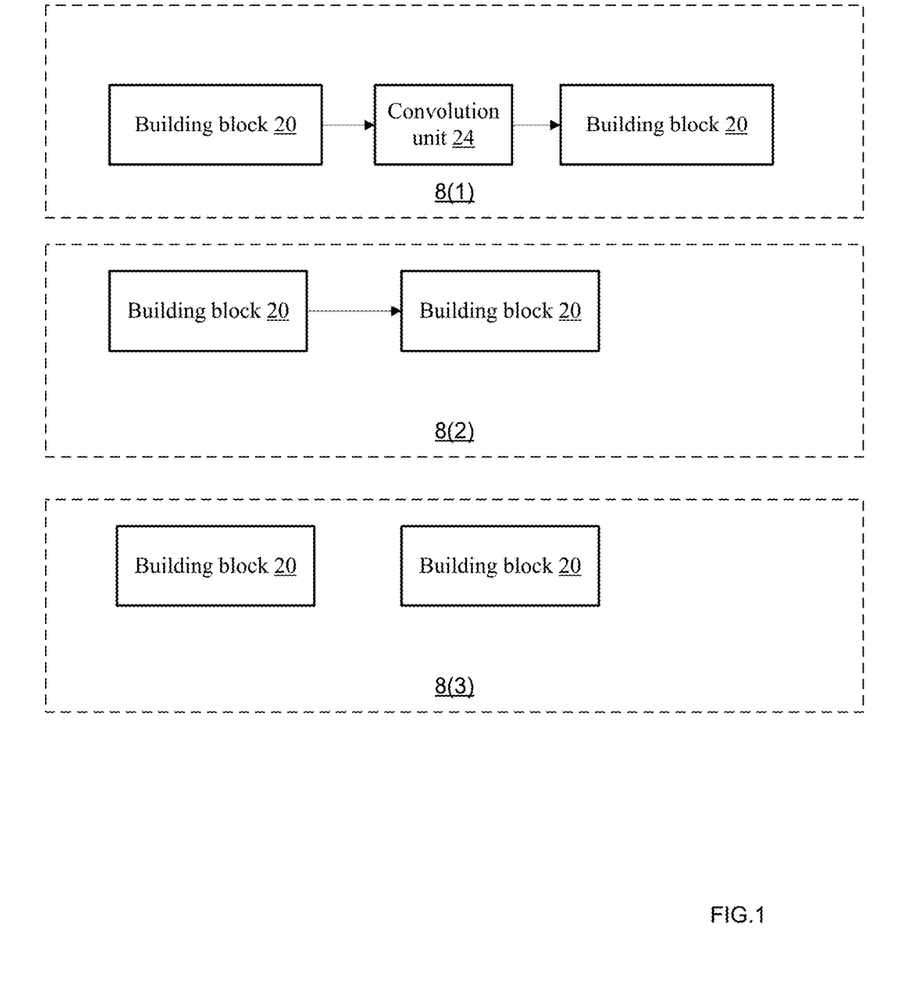
FIG. 1 illustrates examples of apparatuses.

There may be provided an apparatus that may include a neural network processor, the neural network processor may include multiple building blocks. FIG. 1 illustrates examples of various apparatuses 8(1), 8(2) and 8(3) that include one or more building blocks 20. Apparatus 8(1) includes a sequence of a building block 20, a convolution unit 24 and another building block 20. Apparatus 8(2) includes a sequence of two building blocks 20. Apparatus 8(3) illustrates building blocks 20 that are not serially connected to each other.

Figure 2:
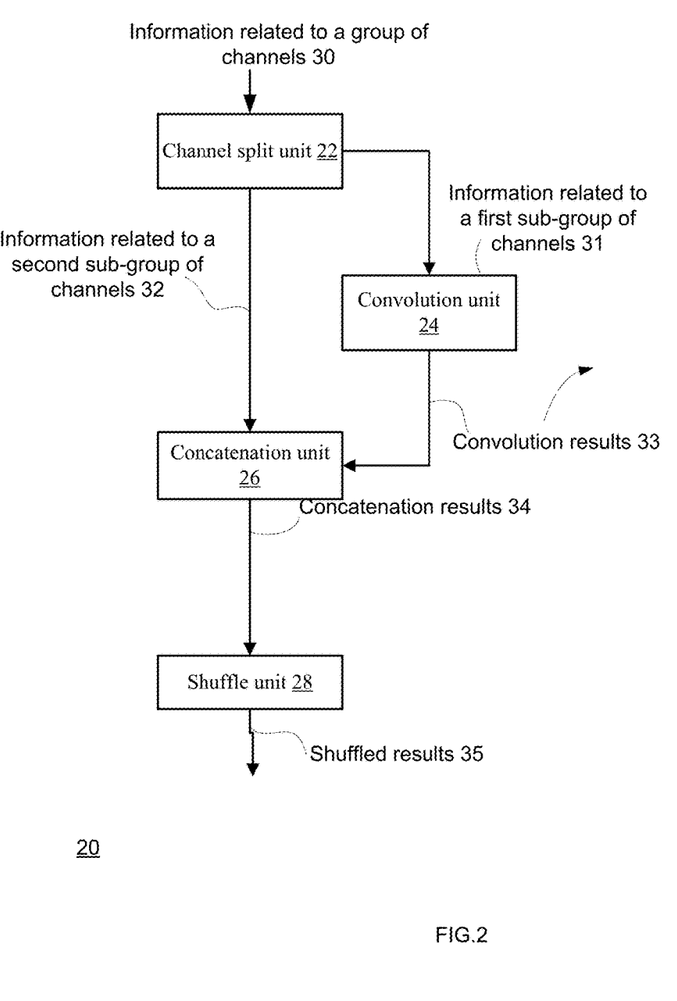
FIG. 2 illustrates an example of a building block.

FIG. 2 illustrates a building block 20. All of only some of the multiple building blocks of the apparatus may be building blocks such as building block 20.

Building block 20 may include or consist or consist essentially of a channel split unit 22, a convolution unit 24, a concatenation unit 26, and a shuffle unit 28.

The channel split unit 22 may be configured to receive information related to a group of channels 30, send information related to a first sub-group of channels 31 to the convolution unit 24, and send information related to a second sub-group of channels 32 to the concatenation unit 26.

The convolution unit 24 may be configured to perform at least one convolution operation on the information related to a first sub-group of channels 31 to provide convolution results 33. The convolution results 33 are associated with the first sub-group of channels 31 in the sense that they are an output of convolution operations applied on the information related to a first sub-group of channels 31.

The convolution unit 24 may be a five by five convolution unit, may include a five by five convolution unit, may differ from a one by one convolution unit, may not include a one by one convolution unit, and the like.

The concatenation unit 26 may be configured to concatenate the convolution results 33 and the information related to a second sub-group of channels 32 to provide concatenation results 34.

Each concatenation result represents a dedicated channel of the group of channels.

The shuffle unit 28 may be configured to shuffle the concatenation results 34 to provide shuffled results 35. This may involve shuffling the concatenation results.

Each shuffled result may be associated with a dedicated channel of the group of channels.

The shuffling may include at least one out of:

Mapping adjacent concatenation results to spaced apart shuffled results.

Interleaving shuffled results related to the first sub-group of channels with shuffled results related to the second sub-group of channels.

Maintaining, within the shuffled results related to the first sub-group of channels, an order of shuffled results related to the first sub-group of channels.

Maintaining, within the shuffled results related to the second sub-group of channels, an order of shuffled results related to the second sub-group of channels.

The group of channels may include a first number (N) of channels, wherein N may be an even positive integer, wherein the first sub-group of channels may include a first half of channels and wherein the second sub-group of channels may include a second half of channels, wherein N/2 may be a half of N.

Figure 3:
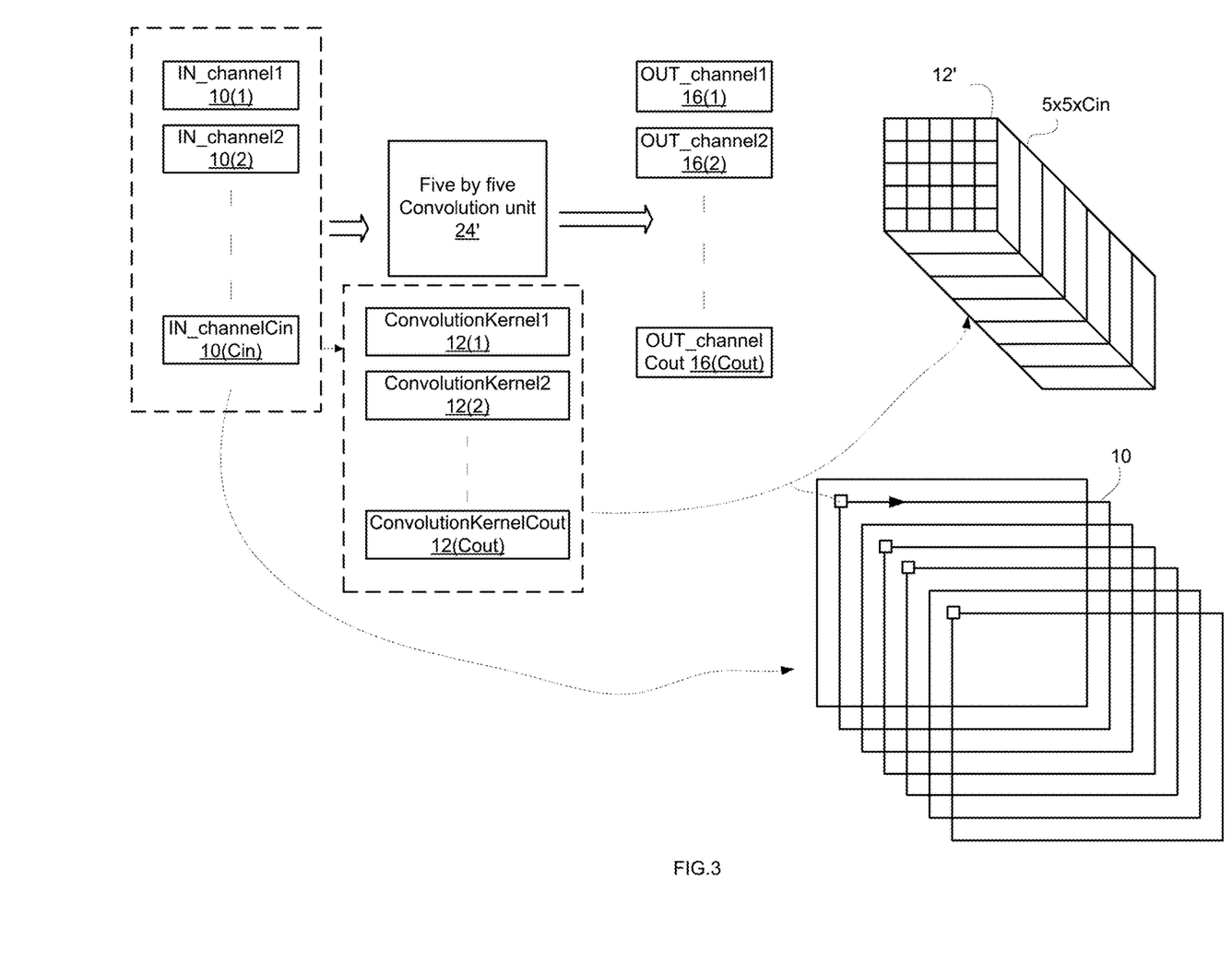
FIG. 3 illustrates an example of a convolutional unit and various data structures.

FIG. 3 illustrates an example of a five by five convolution.

A convolution may be characterized by a size of input data pixels it operated on. For example—a five by five convolution unit works as follows.

Assuming that a five by five convolutional unit 24' receives Cin input channels (IN_channel1-IN_channelCin 10(1)-10(Cin)) and outputs Cout channels (OUT_channel1-OUT_channelCout 16(1)-16(Cout)). In this case there are Cout different convolution kernels (ConvolutionKernel1-Convolution KernelCout 12(1)-12(Cout))—each convolution kernel is a three dimensional kernel and has a dimensions of 5×5× Cin. Each convolutional kernel (see 12') is applied on a three dimensional data structure 10 that includes all of the Cin input channels (IN_channel1-IN_channelCin 10(1)-10(Cin)). Each convolutional kernel scans the data structure to provide an output related to a single output channel.

Assuming that Cin equals Cout and equals (N/2) then there are (N/2) different convolutional kernels, each convolutional kernel has a dimension of five by five by (N/2), and scans a data structure that include the N/2 input channels.

Figure 4:
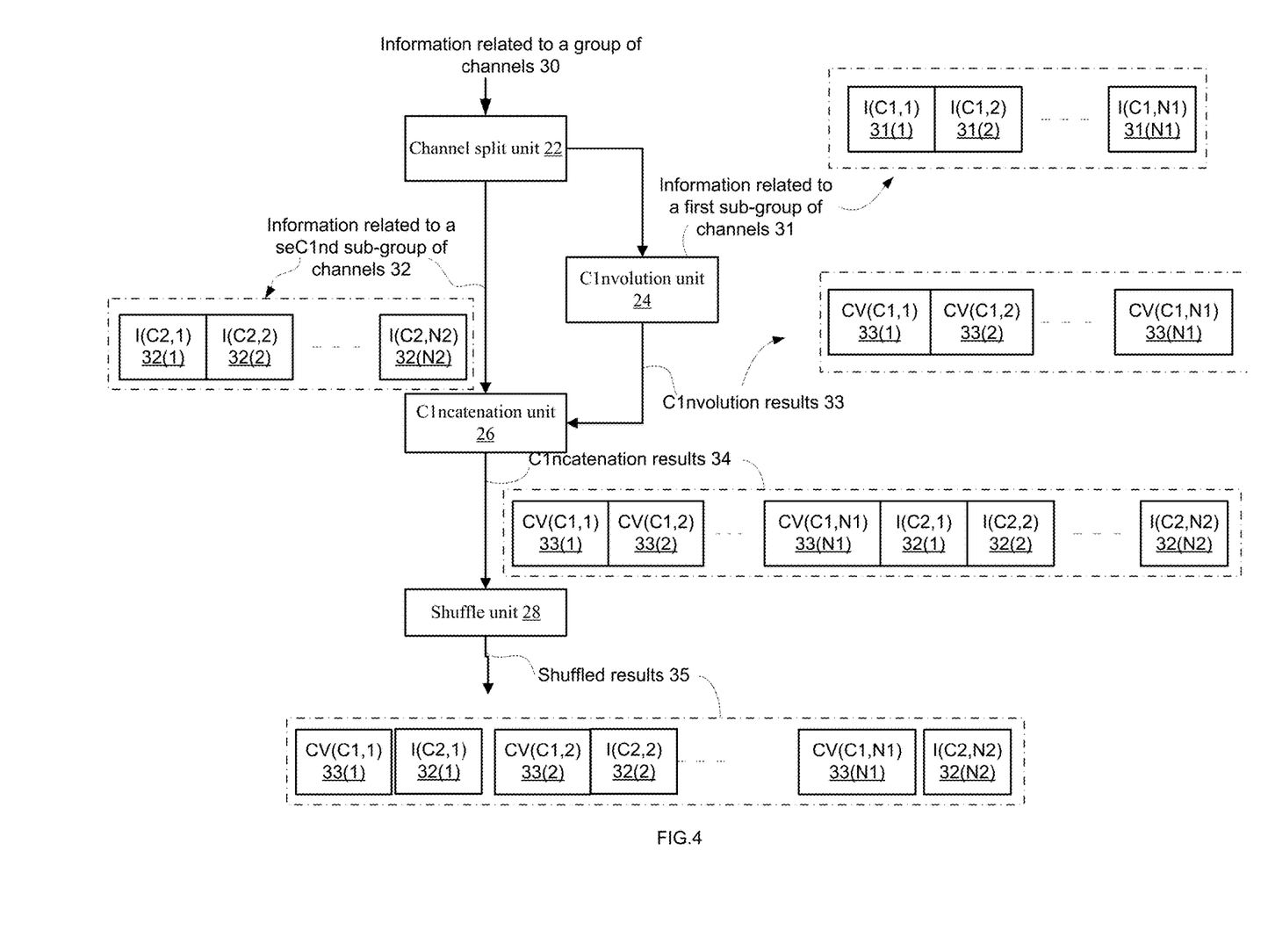
FIG. 4 illustrates an example of a building block and various data structures.

FIG. 4 is an example of building block 20 and various information units.

It is assumed that the first sub-group of channels includes a first plurality (N1) of channels and that the second sub-group of channels includes a second plurality (N2) of channels. N1 may equal N2. N1 may differ from N2.

The information related to the first sub-group of channels 31 includes N1 first channel information units I(C1,1)-I(C1,N1) 31(1)-31(N1).

The information related to the second sub-group of channels 32 includes N2 second channel information units I(C2,1)-I(C2,N2) 32(1)-32(N2).

The convolution results 33 include convolution results CV(C1,1)-CV(C1,N1) 33(1)-33(N1).

The concatenation results 34 start by I(C1,1)-I(C1,N1) 31(1)-31(N1) that are followed by CV(C1,1)-CV(C1,N1) 33(1)-33(N1).

The shuffled results 35 of FIG. 2 illustrates an example of a shuffling that corresponds to all four examples of shuffling rules illustrated above. Other shuffling that result in other arrangements may be applied.

Figure 5:
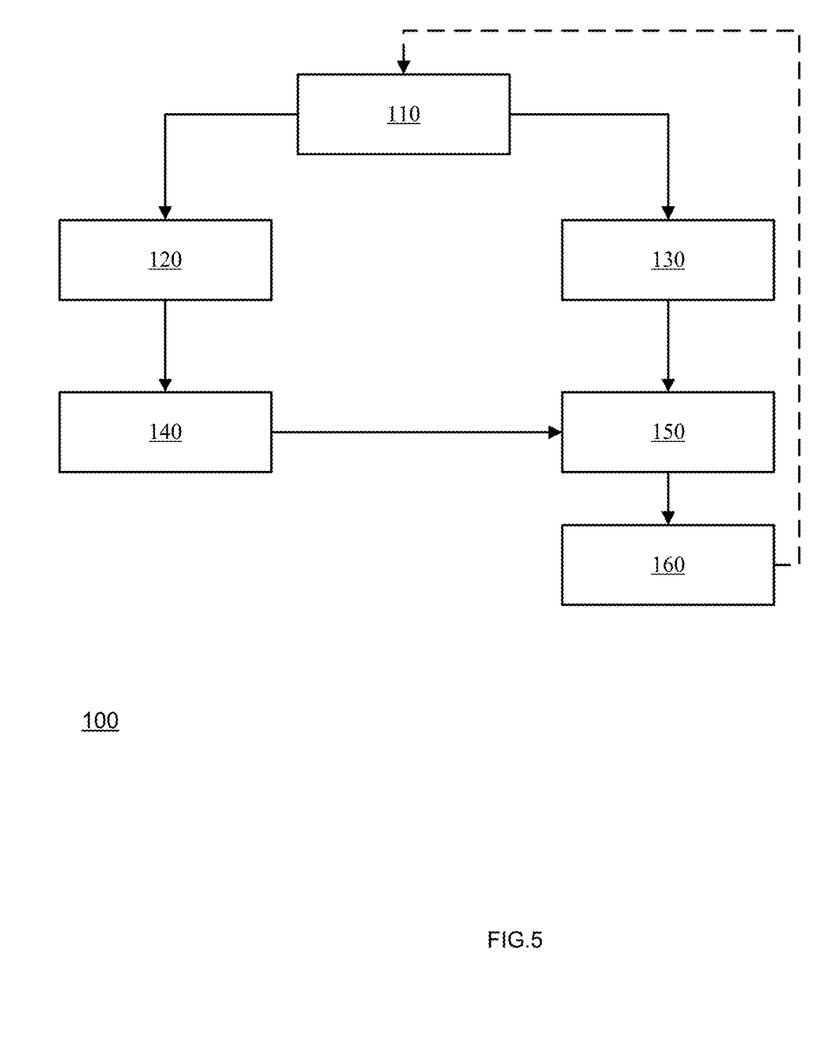
FIG. 5 illustrates an example of a method.

FIG. 5 is an example of method 100.

Method 100 may include steps 110, 120, 130, 140, 150 and 160.

Step 110 may include receiving, by a channel split unit, information related to a group of channels.

Step 110 may be followed by steps 120 and 130.

Step 120 may include sending information related to a first sub-group of channels to a convolution unit.

Step 130 may include sending information related to a second sub-group of channels to a concatenation unit.

Step 120 may be followed by step 140 of performing, by a convolution unit, at least one convolution operation on the information related to a first sub-group of channels to provide convolution results.

The convolution results are associated with the first sub-group of channels in the sense that they are an output of convolution operations applied on the information related to a first sub-group of channels.

The convolution unit may be a five by five convolution unit, may include a five by five convolution unit, may differ from a one by one convolution unit, may not include a one by one convolution unit, and the like.

Steps 130 and 140 may be followed by step 150 of concatenating, by the concatenation unit, the convolution results and the information related to a second sub-group of channels to provide concatenation results.

Each concatenation result may represent a dedicated channel of the group of channels.

Step 150 may be followed by step 160 of shuffling, by a shuffle unit, the concatenation results to provide shuffled results.

Each shuffled result may be associated with a dedicated channel of the group of channels.

The shuffled result may be outputted from a building block and may undergo further processing.

The shuffling may include at least one out of:

Mapping adjacent concatenation results to spaced apart shuffled results.

Interleaving shuffled results related to the first sub-group of channels with shuffled results related to the second sub-group of channels.

Maintaining, within the shuffled results related to the first sub-group of channels, an order of shuffled results related to the first sub-group of channels.

Maintaining, within the shuffled results related to the second sub-group of channels, an order of shuffled results related to the second sub-group of channels.

The group of channels may include a first number (N) of channels, wherein N may be an even positive integer, wherein the first sub-group of channels may include a first half of channels and wherein the second sub-group of channels may include a second half of channels, wherein N/2 may be a half of N.

Multiple iterations of method 100 (see for example the dashed line from step 160 to step 110), in which the shuffling may cause that different channels undergo the convolution may provide a predefined distribution (for example—a Binomial distribution) of channels that undergo the convolution.

The apparatus and method may be or may be implemented on integrated circuits that have a fixed five by five convolution units, that do not have a one to one convolution units, and that may support max-pooling only after convolution.

The neural network processor may include additional units such as at least one convolution unit that may be coupled between a pair of building blocks. The neural network processor may be an integrated circuit, may include more than a single integrated circuit, may be a part of an integrated circuit, may be a hardware accelerator, may be tailored to neural network processing, may be applied on a general purpose integrated circuit, may be applied on a graphic processor, and the like. The apparatus may be a computerized system, a part of a computerized system, may be a part of a laptop, desktop, a vehicle dedicated integrated circuit, and the like.

The apparatus and method may be applied on integrated circuits such as Renesas Electronics integrated circuits for vehicles.

Such integrated circuits, for example the Renesas integrated circuit exhibit a very low power consumption and are very popular among vehicle vendors.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

What is claimed is:
1. An apparatus that comprises a neural network processor, the neural network processor comprises multiple building blocks;
   wherein each of the multiple building blocks comprises:
   a channel split unit, a convolution unit, a concatenation unit, and a shuffle unit;
   wherein the channel split unit is executed by the neural network processor to receive information related to a group of channels, send information related to a first sub-group of the group of channels to the convolution unit, and send information related to a second sub-group of the group of channels to the concatenation unit;

wherein the convolution unit is executed by the neural network processor to perform at least one convolution operation on the information related to the first sub-group of the group of channels to provide convolution results; wherein the convolution results are associated with the first sub-group of the group of channels;

wherein the concatenation unit is executed by the neural network processor to concatenate the convolution results and the information related to the second sub-group of the group of channels to provide concatenation results, wherein each concatenation result of the concatenation results represents a dedicated channel of the group of channels;

wherein the shuffle unit is executed by the neural network processor to shuffle the concatenation results to provide shuffled results, wherein each of the shuffled results is associated with a dedicated channel of the group of channels;

wherein the shuffle unit is executed by the neural network processor to interleave shuffled results related to the first sub-group of the group of channels with shuffled results related to the second sub-group of the group of channels; and wherein the shuffle unit is executed by the neural network processor to maintain, within the shuffled results related to the first sub-group of the group of channels, an order of shuffled results related to the first sub-group of the group of channels.

2. The apparatus according to claim 1 wherein adjacent concatenation results are mapped to spaced apart shuffled results.

3. The apparatus according to claim 1 wherein the shuffle unit is executed by the neural network processor to maintain, within the shuffled results related to the second sub-group of channels, an order of shuffled results related to the second sub-group of channels.

4. The apparatus according to claim 1 wherein the group of channels comprises a first number (N) of channels, wherein N is an even positive integer, wherein the first sub-group of channels comprises a first half of channels and wherein the second sub-group of channels comprises a second half of channels, wherein N/2 is a half of N.

5. The apparatus according to claim 1 wherein the convolution unit is a five by five convolution unit.

6. The apparatus according to claim 1 wherein the convolution unit is not a one by one convolution units.

7. The apparatus according to claim 1 wherein each of the multiple building blocks consists essentially of the channel split unit, the convolution unit, the concatenation unit, and the shuffle unit.

8. The apparatus according to claim 1 wherein each of the multiple building blocks consists of the channel split unit, the convolution unit, the concatenation unit, and the shuffle unit.

9. The apparatus according to claim 1 wherein each of the multiple building blocks consists of the channel split unit, the convolution unit, the concatenation unit, and the shuffle unit.

10. The apparatus according to claim 1 comprises at least one convolution unit that is coupled between a pair of building blocks.

11. The apparatus according to claim 1 wherein at least one convolution unit does not include one by one convolution subunits.

12. The apparatus according to claim 1 wherein at least one convolution unit comprises of five by five convolution subunits.

13. A non-transitory computer readable medium that stores instructions, the instructions are executed by a neural network processor to perform a method comprising:

receiving information related to a group of channels;

sending information related to a first sub-group of the group of channels to a convolution unit;

sending information related to a second sub-group of the group of channels to a concatenation unit;

performing, by the convolution unit, at least one convolution operation on the information related to the first sub-group of the group of channels to provide convolution results; wherein the convolution results are associated with the first sub-group of the group of channels;

concatenating, by the concatenation unit, the convolution results and the information related to the second sub-group of the group of channels to provide concatenation results, wherein each concatenation result of the concatenation results represents a dedicated channel of the group of channels; and shuffling, by a shuffle unit, the concatenation results to provide shuffled results, wherein each of the shuffled results is associated with a dedicated channel of the group of channels;

wherein the shuffle unit is executed by the neural network processor to interleave shuffled results related to the first sub-group of the group of channels with shuffled results related to the second sub-group of the group of channels; and wherein the shuffle unit is executed by the neural network processor to maintain, within the shuffled results related to the first sub-group of the group of channels, an order of shuffled results related to the first sub-group of the group of channels.

14. A method executed by a neural network processor, comprising:

receiving information related to a group of channels;

sending information related to a first sub-group of the group of channels to a convolution unit;

sending information related to a second sub-group of the group of channels to a concatenation unit;

performing, by the convolution unit, at least one convolution operation on the information related to the first sub-group of the group of channels to provide convolution results; wherein the convolution results are associated with the first sub-group of the group of channels;

concatenating, by the concatenation unit, the convolution results and the information related to the second sub-group of the group of channels to provide concatenation results, wherein each concatenation result of the concatenation results represents a dedicated channel of the group of channels; and shuffling, by a shuffle unit, the concatenation results to provide shuffled results, wherein each of the shuffled results is associated with a dedicated channel of the group of channels;

wherein the shuffle unit is executed by the neural network processor to interleave shuffled results related to the first sub-group of the group of channels with shuffled results related to the second sub-group of the group of channels; and wherein the shuffle unit is executed by the neural network processor to maintain, within the shuffled results related to the first sub-group of the group of channels, an order of shuffled results related to the first sub-group of the group of channels.

* * * * *